July 19, 1960

P. L. AUER ET AL 2,945,443

PUMP OPERATION

Filed Aug. 22, 1957

Inventors:
Peter L. Auer,
Amandus H. Sharbaugh,
by Paul A. Frank
Their Attorney.

United States Patent Office 2,945,443
Patented July 19, 1960

2,945,443
PUMP OPERATION

Peter L. Auer, Schenectady, and Amandus H. Sharbaugh, Scotia, N.Y., assignors to General Electric Company, a corporation of New York Filed Aug. 22, 1957, Ser. No. 679,575

3 Claims. (Cl. 103—1)

This invention relates to pumps for dielectric liquids. More particularly, the invention relates to a method of operating a liquid dielectric pump.

The need for fluid pumps having low maintenance requirements has long been recognized. The ideal solution to the problem of a low maintenance pump is a pump having no moving parts. One of the best known pumps of this character is the electromagnetic pump employed in pumping conducting liquids such as liquid metals. However, these pumps for liquid conducting metals are unsatisfactory for insulating or dielectric liquids. One pump which is effective in pumping dielectric liquids is described in "Chemical and Engineering News," May 14, 1956, vol. 34, No. 20 at pages 2370 et seq. This pump comprises a pair of screen electrodes which are immersed in a dielectric liquid. When a direct current potential is placed between the electrodes a pumping action is observed. However, in the usual operation of this pump it is found that the rate of pumping is lower than desired for many applications.

It is an object of the present invention to provide an improved method for the operation of liquid dielectric pumps of the type described.

A further object of this invention is to provide an improved method of operation of liquid dielectric pumps of the type described wherein it is possible to obtain higher flow rates than with prior art methods of operation.

These and other objects of our invention are accomplished by immersing a pair of screen electrodes in parallel, spaced relationship in a dielectric liquid, striking an arc between the electrodes, thereafter extinguishing the arc, and subsequently maintaining a direct current potential between the electrodes with the direct current potential being below the breakdown potential of the dielectric liquid being pumped.

Figure 1:
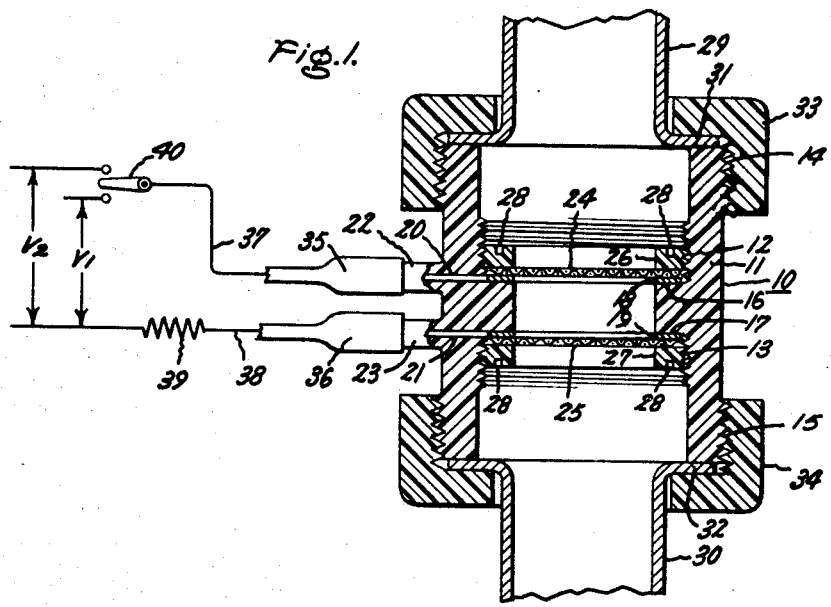
Figure 2:
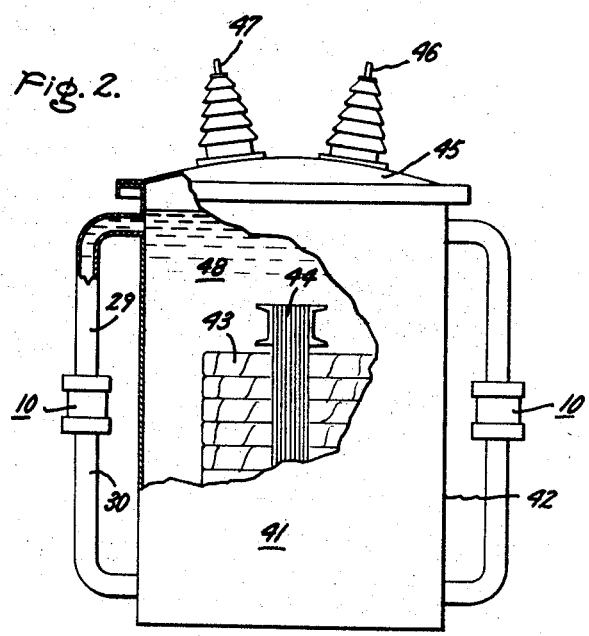

Our invention may be best understood by reference to the following description taken in connection with the drawing, in which Fig. 1 is a view, partly in section, of a dielectric liquid pump employed in the practice of the present invention and Fig. 2 is a conventionalized view, partly in section, showing the application of the pumps employed in the present invention to the pumping and cooling of the liquid dielectric of a transformer.

In Fig. 1 the dielectric liquid pump is indicated generally at 10 and comprises a conduit 11 formed of any suitable insulating material, such as glass or a plastic, e.g. a phenol formaldehyde resin. Conduit 11 has internal threads 12 and 13 and external threads 14 and 15 with a raised interior portion defining shoulders 16 and 17. Annular conducting rings 18 and 19, which may be formed of copper, platinum or any other conducting metal, are positioned adjacent shoulders 16 and 17 and are electrically connected to leads 20 and 21 which extend through the wall of conduit 11 and terminate in suitable terminals 22 and 23 which are fixed to the outside of conduit 11. Screen electrodes 24 and 25, which are positioned adjacent to rings 18 and 19, are held in physical and electrical contact with rings 18 and 19 by means of annular fastening members 26 and 27 which are formed of metal or an insulating material and which are threaded into threads 12 and 13 of conduit 11. Detents 28 are provided in members 26 and 27 to facilitate the tightening of members 12 and 13 towards shoulders 16 and 17.

In the application of the dielectric liquid pump of the present invention, means are provided for attaching the pump to a line or conduit containing a dielectric liquid. This may be accomplished by providing conduits 29 and 30, which carry a dielectric liquid, with flanges 31 and 32. These flanges can be held against the ends of conduit 11 by threaded fastening members 33 and 34 which tightly hold flanges 31 and 32 in fluid-tight engagement with conduit 11. Members 33 and 34 can be formed of plastic, metal or glass. With the arrangement shown in Fig. 1 a complete fluid-tight assembly is provided which is adaptable to the pumping of a dielectric liquid upon the application of a direct current potential between electrodes 24 and 25.

In the prior art methods of operating dielectric liquid pumps of the type described, the usual procedure has been to supply a direct current potential to the electrodes, for example, through connectors 35 and 36, terminals 22 and 23, leads 20 and 21, and rings 18 and 19 to screen electrodes 24 and 25. The applied direct current potential between electrodes 24 and 25 has been selected to be below the breakdown potential of the particular dielectric liquid being pumped. The present invention is based on our discovery that the rate of pumping of dielectric liquids may be increased 10 to 20 fold if, prior to operation of the dielectric liquid pump at conventional voltage, an arc is struck between the two electrodes immersed in the dielectric liquid and if this arc is then extinguished and the normal operating voltage is then applied to the pump.

Electrodes 24 and 25 have been described previously as screen electrodes. The term "screen" is intended to indicate that the electrodes contain a number of holes therethrough through which the dielectric fluid may flow. The term "screen" includes structures such as conventional wire mesh woven screening, as well as perforated plates. The particular size and shape of electrodes 24 and 25 may vary within wide limits. Generally, however, it is preferred to have these electrodes with a periphery which conforms to the general shape of the conduit in which they are employed. Thus, since these electrodes are employed primarily in conduits having a circular cross-section, they are generally circular in shape. Desirably the screen is of such a size as to substantially fill the conduit so that all fluid flowing in the conduit will flow through the screens. However, the pump of the present invention is still operative when the screen is smaller than the conduit. For most efficient operation, the screen electrodes 24 and 25 are positioned in a plane perpendicular to the axis of the conduit in which they are employed. The spacing between the screen electrodes 24 and 25 may also vary within wide limits. Generally, however, they are positioned within from 1 to 10 millimeters of each other so that the potential difference between the screens may be kept to a reasonable value.

The rate of flow of a dielectric liquid under the action of pump 10 depends on two primary factors. The first is the potential difference between electrodes 24 and 25 and the second is the cross-sectional area of the electrodes. Generally, the volume rate of flow increases in proportion to the cross-sectional area of the electrodes. For a given cross-sectional area and with a given electrode spacing, the linear flow velocity is approximately proportional to the potential difference between screen electrodes 24 and 25.

The insulating or dielectric liquids referred to in this application are well known insulating fluids and are generally organic liquids. The term "dielectric liquid" is understood in the art to refer to a liquid having a resistivity at least about $10^{-10}$ ohm-centimeters. Among the common dielectric liquids are hydrocarbons such as normal alkanes having from 5 to 14 carbon atoms, branched-chain alkanes such as 2-methylpentane, 2,4-dimethylpentane, 2,2,4-trimethylpentane, etc.; mono-olefins containing from about 5 to 14 carbon atoms; aromatic hydrocarbons such as benzene, methylbenzene, ethylbenzene, n-propyl-benzene, isopropylbenzene, n-butylbenzene, t-butylbenzene; as well as halogenated hydrocarbons such as chlorobenzene, dichlorobenzenes, pentachlorodiphenyls, etc.; and other materials such as nitrobenzene. In addition to having a resistivity of at least $10^{10}$ ohm-centimeters, another characteristic of dielectric liquids is an intrinsic dielectric strength or breakdown voltage of about 100,000 volts per millimeter. In practice, because of unavoidable impurities, these dielectric liquids usually have an actual dielectric strength of about 50,000 volts per millimeter. Because of field inhomogeneties caused by the inherent roughness of screen electrodes, the effective dielectric strength of a dielectric liquid between two screen electrodes spaced from 1 to 10 millimeters from each other is about 20,000 volts per millimeter. Thus, in the usual operation of dielectric liquid pumps by prior art methods, it has been common to apply a voltage of less than 20,000 volts per millimeter of electrode spacing to effect pumping of the liquid.

In Fig. 1 is shown a circuit arrangement useful in carrying out the method of the present invention. In Fig. 1 are shown leads 37 and 38 which are connected to sources of direct current and which are connected respectively to connectors 35 and 36. Leads 37 and 38 are connected to two sources of voltages $V_1$ and $V_2$. Lead 38 is connected to $V_1$ and $V_2$ through resistor 39, which serves to limit the current passing into the dielectric pump. Lead 37 is connected to either $V_1$ or $V_2$ through switch 40. Potential $V_1$ is selected so that the potential between screen electrodes 24 and 25 is lower than the breakdown potential of the dielectric fluid in conduit 11. Voltage $V_2$ has a value such that the potential difference between electrodes 24 and 25 is greater than the breakdown potential of the fluid in conduit 11. Thus, when voltage $V_2$ is applied to pump 10, arcing between the electrodes will occur. When voltage $V_1$ is applied to electrodes 24 and 25, no arcing will occur.

In the actual operation of dielectric pump 10 by the method of the present invention the values of $V_1$ and $V_2$ and resistance 39 may vary within fairly wide limits. As previously mentioned, the purpose of resistance 39 is to limit the magnitude of the current through the dielectric field during the period of arcing between electrodes 24 and 25. For this reason, the only requirement of resistor 39 is that it be of a relatively high magnitude. Satisfactory results are obtained when resistance 39 has a value of from 1 to 10 megohms. This resistance has little effect on the potential difference between electrodes 24 and 25 during the usual operation of dielectric pump 10 since the current through the dielectric fluid is in the microampere range and the corresponding IR drop across resistance 39 is low. Therefore, during normal operation of the pump 10 direct current potential $V_1$ is essentially equal to the potential difference between the two electrodes. During periods of striking of the arc between electrodes 24 and 25 the resistance 39 has two different effects on the system. At zero time, when switch 40 is arranged so as to connect lines 37 and 38 to direct current potential $V_2$, the current through the dielectric fluid and consequently the IR drop through resistance 39 are extremely low so that effectively potential difference $V_2$ is equal to the potential difference between electrodes 24 and 25. This direct current potential difference $V_2$ is sufficient to strike an arc through the dielectric liquid being pumped. As soon as the arc is established the dielectric liquid in the region between the electrode becomes a fairly good conductor. This permits continuation of the arc with a very low potential difference. Under these conditions, resistance 39 tends to reduce the current flowing through the dielectric liquid so as to prevent "short circuiting" of the apparatus.

From the foregoing description it is seen that the value of direct current potential $V_2$ must be greater than the effective breakdown potential of the dielectric fluid being pumped so as to strike an arc through the fluid between electrodes 24 and 25. In practice it has been found that for each millimeter of electrode spacing direct current potential $V_2$ should be equal to 20,000 volts or more. With a potential of 20,000 volts per millimeter of electrode spacing and with the high resistance 39 in the circuit, it is found that an arc can be struck between the electrodes and this arc will continue until potential $V_2$ is removed from the electrodes. The value of potential difference $V_1$ is selected so as to be as high as possible without causing arcing between electrodes 24 and 25. In actual practice, satisfactory operation of pump 10 is accomplished with values of potential $V_1$ of from about 1,000 to 15,000 volts per millimeter of electrode spacing.

In the actual operation of pump 10 by the method of the present invention, potential $V_2$ is applied across electrodes 24 and 25 by means of switch 40. As soon as potential $V_2$ is connected, arcing through the dielectric fluid between electrodes 24 and 25 begins and continues until the circuit is broken by means of switch 40. Generally, times of from about 2 to 60 seconds are allowed for this arcing process. Upon completion of the preselected arcing time, switch 40 is moved to the neutral position shown in Fig. 1 so as to extinguish the arc. As soon as the arc is extinguished, voltage $V_1$ is connected across electrodes 24 and 25 by means of switch 40. Potential $V_1$ then causes pumping of the dielectric liquid in conduit 17 from the negative electrode towards the positive electrode. This pumping action continues so long as potential $V_1$ is applied to the electrodes.

The following description illustrates the preferred embodiment of our invention. Dielectric pump 10 of Fig. 1 was inserted between two conduits 29 and 30 which were connected to a reservoir of chlorobenzene. The entire assembly was arranged so that conduit 11, which was formed of glass, and conduits 29 and 30 were in a horizontal position. The entire assembly was filled with chlorobenzene. Conduit 11 had an internal diameter of 1.0 inch and electrodes 24 and 25 were formed of a circular stainless steel 20 x 20 mesh screen. The diameters of electrodes 24 and 25 were essentially equal to the diameter of conduit 11 and the two screens were separated by a distance of 1 millimeter. With resistance 39 having a value of 10 megohms, with direct current potential $V_1$ having a value of 5000 volts and direct current potential $V_2$ being equal to 20,000 volts, switch 40 was positioned so as to apply the 20,000 volts between electrodes 24 and 25. This immediately established an arc between electrodes 24 and 25 and this arcing was continued for approximately 10 seconds. At the end of this time switch 40 was moved into neutral position so as to extinguish the arc. After about 2 seconds the 5000 volts direct current potential was applied between electrodes 24 and 25 by means of switch 40. With this arrangement, electrode 24 was positive with respect to electrode 25. As soon as the 5000 volts was applied between the two electrodes, the chlorobenzene was pumped from electrode 25 to electrode 24 with a linear velocity of approximately 2 centimeters per second. When this procedure was repeated, except that the arcing step was eliminated, the chlorobenzene was pumped at a rate of only 0.1 centimeter per second. Thus, it is seen that with the method of the present invention a 20 fold increase in pumping rate was obtained over the rate obtained by prior art methods.

Screen electrodes 24 and 25 can be formed of any desirable metal, so long as the metal is a reasonable conductor. Suitable metals include, for example, iron, copper, stainless steel, aluminum, nickel, platinum, tantalum, etc., as well as conducting alloys. Screens 24 and 25 may both be formed of the same metal or may be formed of different metals.

Although potential $V_2$ has been previously described as a direct current potential, it should be understood that potential $V_2$ may also be an alternating current potential since the sole function of this potential is to cause arcing between electrodes, which arcing can be accomplished by either alternating or direct current. For simplicity of construction and operation, however, it is usually preferred to employ a direct current potential for potential $V_2$.

In Fig. 2 is shown the application of the dielectric pump employed in the practice of the present invention and the method of the present invention in the circulation of the dielectric liquid contained in a transformer. In the cooling of transformer dielectric liquids, only a low velocity is required since the rate of heating of the dielectric liquid is not large and sufficient mass and heat transfer can be obtained by the application of the dielectric pump employing the method of this invention. In Fig. 2 is shown generally transformer 41 which comprises a fluid-tight tank or housing 42 encasing windings 43 and core piece 44. Tank 42 is provided with a removable cover 45 through which extend a plurality of electrical terminals, two of which are shown at 46 and 47. These external terminals are connected to windings 43 by conventional means (not shown). The entire tank 42 is filled with dielectric liquid 48. Extending vertically with respect to tank 42 are a plurality of cooling conduits through which the dielectric liquid may flow. Passage of the dielectric liquid, which becomes heated during the operation of the transformer, through these external cooling conduits allows heat transfer from the fluid through the conduits to the ambient atmosphere. Each of these cooling conduits comprises an upper section 29 and a lower section 30 with dielectric liquid pump 10 connected between sections of the conduit. In cooling the dielectric liquid 48 in the transformer the dielectric pump 10 is operated in the same manner as described in connection with the description of the apparatus of Fig. 1.

Although the preferred embodiment of our invention has been disclosed, it will be understood that the invention is not limited to the exact disclosure shown, but that the elements of the invention may be widely modified within the spirit and scope defined by the appended claims.

What we claim as new and desire to secure by Letters Patent of the United States is:

1. The method of pumping a dielectric liquid which comprises immersing a pair of conducting metal screen electrodes in parallel, spaced relationship in said liquid, striking an arc between said electrodes, thereafter extinguishing said arc, and subsequently maintaining a direct current potential between said electrodes, said direct current potential being below the potential at which breakdown of said liquid occurs.

2. The method of pumping a dielectric liquid which comprises immersing a pair of conducting metal screen electrodes in parallel, spaced relationship in said liquid, applying a potential between said electrodes greater than the effective dielectric strength of said liquid, whereby an arc passes through said dielectric liquid, thereafter extinguishing said arc, and subsequently maintaining a direct current potential between said electrodes, said potential being below the potential at which breakdown of said liquid occurs.

3. The method of pumping a dielectric liquid which comprises immersing a pair of conducting metal screen electrodes in parallel, spaced relationship in said liquid, applying a potential between said electrodes in excess of 20,000 volts per millimeter of electrode spacing, whereby an electric arc passes through said liquid, thereafter extinguishing said arc by removing the potential from said electrodes, and subsequently applying a direct current potential of from 1000 to 15,000 volts per millimeter of electrode spacing between said electrodes, whereby said liquid is caused to flow.

References Cited in the file of this patent
UNITED STATES PATENTS 2,553,944    Schlesman _____ May 22, 1951